United States Patent [19]

Miloscia et al.

[11] 4,322,510

[45] Mar. 30, 1982

[54] NITRILE BARRIER RESINS AND PROCESS FOR THEIR MANUFACTURE

[75] Inventors: William J. Miloscia, Shaker Heights; John A. Turnbaugh, Cleveland; Brandford E. Giddings, Warrensville Heights, all of Ohio

[73] Assignee: The Standard Oil Company, Cleveland, Ohio

[21] Appl. No.: 197,316

[22] Filed: Oct. 15, 1980

Related U.S. Application Data

[63] Continuation of Ser. No. 770,921, Feb. 22, 1977, abandoned.

[51] Int. Cl.$^3$ ............................................. C08F 279/02
[52] U.S. Cl. ..................................... 525/310; 525/292; 525/316
[58] Field of Search ....................... 525/316, 292, 310

[56] References Cited

U.S. PATENT DOCUMENTS 4,025,581  5/1977  Powell et al. ................... 260/880 R
4,039,734  8/1977  Hendy ............................. 260/880 R

OTHER PUBLICATIONS

Ham, "Copolymerization", Interscience Publishers, New York (1964) pp. 695, 778, 786 & 797.

*Primary Examiner*—William F. Hamrock
*Attorney, Agent, or Firm*—William D. Mooney; Herbert D. Knudsen; Larry W. Evans

[57] ABSTRACT

Impact-resistant polymers having excellent color, clarity and low permeability to gases and vapors are prepared by polymerizing in a specified manner an olefinically unsaturated nitrile such as acrylonitrile, an ester of an olefinic acid such as methyl acrylate, or a vinyl ester such as vinyl acetate, and a vinyl aromatic monomer such as styrene optionally in the presence of a diene rubber.

4 Claims, No Drawings

NITRILE BARRIER RESINS AND PROCESS FOR THEIR MANUFACTURE

This is a continuation of application Ser. No. 770,921 filed Feb. 22, 1977 abandoned.

The present invention relates to novel polymeric compositions which are clear and colorless and have low permeability to gases, and more particularly pertains to impact-resistant polymeric compositions which function as gas and vapor barrier materials and are composed of a conjugated diene monomer, an olefinically unsaturated nitrile, an ester of an olefinically unsaturated carboxylic acid, or a vinyl ester, and a vinyl aromatic monomer, and to a process for preparing same.

The polymeric products of the present invention are prepared by polymerizing a major proportion of an olefinically unsaturated nitrile, such as acrylonitrile, and a minor proportion of an ester of an olefinically unsaturated carboxylic acid, such as methyl acrylate, or a vinyl ester, such as vinyl acetate, and a vinyl aromatic monomer, such as styrene, optionally in the presence of a preformed rubbery polyme composed of a major proportion of a conjugated diene monomer, such as butadiene, and optionally a minor proportion of another monoolefinic monomer such as an olefinically unsaturated nitrile, an ester of an olefinically unsaturated carboxylic acid or a vinyl aromatic monomer.

The conjugated diene monomers useful in this invention include butadiene-1,3, isoprene, chloroprene, bromoprene, cyanoprene, 2,3-dimethyl-butadiene-1,3, 2-ethyl-butadiene-1,3, 2,3-diethyl-butadiene-1,3, and the like. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

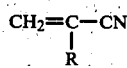

wherein R is hydrogen, a lower alkyl group having from 1 to 4 carbon atoms, or a halogen. Such compounds include acrylonitrile, methacrylonitrile, ethacrylonitrile, and the like. Most preferred are acrylonitrile and methacrylonitrile and mixtures thereof.

The esters of olefinically unsaturated carboxylic acids useful in the present invention are preferably the lower alkyl esters of alpha,beta-olefinically unsaturated carboxylic acids and more preferred are the esters having the structure

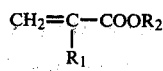

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates methyl alpha-chloroacrylate, ethyl alphachloroacrylate, and the like. Most preferred are methyl acrylate, ethyl acrylate, methyl methacrylate and ethyl methacrylate.

The vinyl esters useful in this invention include vinyl acetate, vinyl propionates, vinyl butyrates, isopropenyl acetate, isopropenyl propionates, isopropenyl butyrates, and the like. Most preferred is vinyl acetate.

The vinyl aromatic monomers useful in this invention include styrene, alpha-methyl styrene, the vinyl toluenes, the vinyl xylenes, and the like. Most preferred is styrene.

The polymers of this invention are prepared in an aqueous medium, and it is essential that the vinyl aromatic monomer be added to the polymerization continuously at a controlled rate during the course of the polymerization. The most preferred process is an aqueous emulsion polymerization. The novel process of this invention involves the polymerization of the olefinically unsaturated nitrile and ester of the olefinically unsaturated carboxylic acid or vinyl ester optionally in the presence of the preformed diene rubber with controlled continuous addition of the vinyl aromatic monomer during the course of the polymerization. The aqueous emulsion polymerization is carried out in water in the presence of an emulsifier and a free-radical generating polymerization initiator at a temperature of from about 0° to 100° C. in the substantial absence of molecular oxygen.

The preferred polymeric compositions embodied herein are those resulting from the polymerization of 100 parts by weight of (A) from 70 to 90% by weight of at least one nitrile having the structure

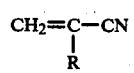

wherein R has the foregoing designation; (B) from 2 to 28% by weight of at least one member selected from the group consisting of (1) an ester having the structure

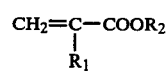

wherein $R_1$ and $R_2$ have the foregoing designations, and (2) a vinyl ester selected from the group consisting of vinyl acetate, vinyl propionates, vinyl butyrates, isopropenyl acetate, isorpopenyl propionates, and isopropenyl butyrates; and (C) from 28 to 2% by weight of styrene, wherein the sum of (A) plus (B) plus (C) is always 100%, in the presence of from 0 to 40 parts by weight of (D) a rubbery polymer of from 50 to 100% by weight of at least one member selected from the group consisting of butadiene and isoprene and from 0 to 50% by weight of at least one monomer selected from the group consisting of a nitrile having the structure

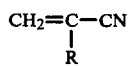

wherein R has the foregoing designation, an ester having the structure

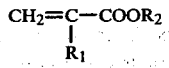

wherein $R_1$ and $R_2$ have the foregoing designations, and styrene.

More specifically, the present invention can be illustrated in the polymerization of a mixture of acrylonitrile and methyl acrylate in the presence of a preformed copolymer of butadiene and acrylonitrile with the continuous addition of styrene to the polymerization mixture to produce a product having good color stability, clarity, excellent impact strength, exceptionally good impact strength and impermeability to gases.

The polymers produced by the process of this invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance and their impact strength and low permeability to gases make them very useful in the packaging industry, and they are particularly useful in the manufacture of bottles, sheet, film and other forms for containing liquids and solids.

In the following illustrative examples, the amounts of ingredients are expressed in parts by weight unless otherwise indicated.

EXAMPLE 1

A. A rubber latex was prepared using the following ingredients and procedures:

| Ingredient | Parts per Hundred of Monomer |
| --- | --- |
| butadiene | 70 |
| acrylonitrile | 30 |
| soap flakes | 1.4 |
| water | 200 |
| sodium polyalkyl naphthalene sulfonate (Daxad 11, Dewey & Almy) | 0.1 |
| sodium salt of diethanol glycine (Versene Fe-3 Specific, Dow Chemical) | 0.05 |
| t-dodecyl mercaptan | 0.65 |
| azobisisobutyronitrile | 0.4 |

The polymerization was carried out in a stirred polymerization reactor under nitrogen at a temperature of 50° C. to about 90% conversion. The resulting latex was stripped of volatiles at reduced pressure and 35° C. for 2 hours and was then ready to use in B below.

B. A terpolymer of acrylonitrile, methyl acrylate and styrene was prepared in aqueous latex using the following ingredients:

| Ingredient | Parts per Hundred of Monomer |
| --- | --- |
| water | 230 |
| acrylonitrile | 75 |
| methyl acrylate | |
| styrene | 5 |
| potassium persulfate | 0.06 |
| pentaerythritol tetra-kis-mercaptopropionate | 1.25 |
| latex of preformed acrylonitrile-butadiene rubber (A of this example) | 10.4 (rubber solids basis) |
| sodium dioctyl sulfosuccinate | 0.85 |
| polyvinyl pyrrolidone | 0.3 |

The polymerization was carried out at 70° C. in an inert atmosphere for 360 minutes with continuous addition of all of the styrene over this period of time to the remainder of the ingredients which were originally placed in the polymerization reactor. The addition of styrene was done using a computer loop which controlled addition of styrene in nearly straight-line relation to the rate of conversion of monomers as measured instantaneously by calorimetry. A conversion of 92% was obtained. The resin was isolated by coagulation with alum solution followed by washing with water and drying. The resin was found to have a Brabender plasticorder torque at 210° C. and 35 rpm of 1185 meter grams. A molded disc of the resin was clear having a yellowness index of 13.2. The resin was also found to have a notched Izod impact strength of 0.81 foot pounds per inch of notch, and an ASTM heat-distortion temperature of 75° C.

C. A repeat of B of this example using 25 parts of methyl acrylate and no styrene produced a polymer outside the scope of this invention having a Brabender plasticorder torque at 210° C. and 35 rpm of 1205 meter grams. A molded disc was found to be cloudy with a yellowness index of 17.6. This resin was also found to have a notched Izod impact strength of 8.3 foot pounds per inch of notch, and an ASTM heat-distortion temperature of 70° C.

D. Another repeat of B of this example in which the acrylonitrile, methyl acrylate and styrene monomers were all batch charged to the reactor initially and no styrene was added during the polymerization in B produced a resin which had a Brabender torque of 1945 meter grams at 210° C. and 35 rpm, was opaque and had a yellowness index of 28.3, a notched Izod impact strength of 1.1 foot pounds per inch of notch, and an ASTM heat-distortion temperature of 75° C.

EXAMPLE 2

The procedure of Example 1B was repeated using a monomer weight ratio of 75:15:10, acrylonitrile:methyl acrylate:styrene. The resulting resin had a Brabender plasticorder torque of 1395 meter grams, a yellowness index of 14.9, a notched Izod impact strength of 2.23 foot pounds per inch of notch, and an ASTM heat-distortion temperature of 76° C. Molded discs of this resin were optically clear.

EXAMPLE 3

A. The procedure of Example 1B was repeated except that a suspension-type resin was made using the following ingredients:

| Ingredient | Parts |
| --- | --- |
| water | 200 |
| acrylonitrile | 75 |
| methyl acrylate | 5 |
| styrene | 20 |
| hydroxyethyl cellulose | 0.2 |
| pentaerythritol-tetra[3-mercaptopropionate] | 1.0 |

| Ingredient | Parts |
| --- | --- |
| azobisisobutyronitrile | 0.2 |

The polymerization was carried out for about 4 hours and the styrene was added continuously during the polymerization reaction using computer control linked to conversion as determined by calorimetry. The resulting resin was found to have 7% haze and a yellowness index of 8.

B. A repeat of A of this example in which all of the acrylonitrile, methyl acrylate and styrene were included in the initial polymerization reaction mixture resulted in a resin which is outside of the scope of this invention which was found to have very poor optical properties and high yellowness index.

EXAMPLE 4

A. The procedure of Example 3A was repeated using a monomer weight ratio of 75:5:20, acrylonitrile:vinyl acetate-styrene. The resulting resin had a percent haze of 6 and a yellowness index of 11.

B. A repeat of A of this example in which all of the monomers were placed in the polymerization reactor initially resulted in a resin which is outside the scope of the present invention which was found to have a percent haze of 61 and a yellowness index of 35.

We claim:

1. The process comprising polymerizing in an aqueous medium at a temperature of from 0° to 100° C. in the presence of a free-radical polymerization initiator a polymerization mixture of 100 parts by weight of
    (A) from 70 to 90% by weight of at least one nitrile having the structure $$CH_2=C-CN$$
    $$\quad\ \ |$$
    $$\quad\ \ R$$

wherein R is hydrogen, a lower alkyl group having from 1 to 4 carbon atoms, or a halogen,
    (B) from 2 to 28% by weight of at least one member selected from the group consisting of
    (1) an ester having the structure $$CH_2=C-COOR_2$$
    $$\quad\ \ |$$
    $$\quad\ \ R_1$$

wherein $R_1$ is hydrogen, an alkyl group having from 1 to 4 carbon atoms, or a halogen, and $R_2$ is an alkyl group having from 1 to 6 carbon atoms, and
    (2) a vinyl ester selected from the group consisting of vinyl acetate, vinyl propionates, vinyl butyrates, isopropenyl acetate, isopropenyl propionates, and isopropenyl butyrates, and
    (C) from 28 to 2% by weight of styrene, wherein the sum of (A) plus (B) plus (C) is always 100% in the presence of from 1 to 40 parts by weight of
    (D) a rubbery polymer of from 50 to 100% by weight of at least one member selected from the group consisting of butadiene and isoprene and from 0 to 50% by weight of at least one monomer selected from the group consisting of a nitrile having the structure $$CH_2=C-CN$$
    $$\quad\ \ |$$
    $$\quad\ \ R$$

wherein R has the foregoing designation, an ester having the structure $$CH_2=C-COOR_2$$
    $$\quad\ \ |$$
    $$\quad\ \ R_1$$

wherein $R_1$ and $R_2$ have the foregoing designations, and styrene,
    wherein (A), (B) and (D) are all charged initially to the polymerization mixture and (C) is added continuously to the polymerization mixture during the course of the polymerization.

2. The process of claim 1 wherein (A) is acrylonitrile.

3. The process of claim 2 wherein (B) is methyl acrylate.

4. The process of claim 2 wherein (B) is vinyl acetate.

* * * * *